United States Patent
Kawasoe

(10) Patent No.: US 10,193,337 B2
(45) Date of Patent: Jan. 29, 2019

(54) SEMICONDUCTOR DEVICE

(71) Applicant: LAPIS Semiconductor Co., Ltd., Yokohama (JP)

(72) Inventor: Suguru Kawasoe, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 272 days.

(21) Appl. No.: 15/081,840

(22) Filed: Mar. 25, 2016

(65) Prior Publication Data

US 2016/0285260 A1  Sep. 29, 2016

(30) Foreign Application Priority Data

Mar. 26, 2015  (JP) .................................. 2015-063718

(51) Int. Cl.
H02H 9/04 (2006.01)

(52) U.S. Cl.
CPC .................................. H02H 9/046 (2013.01)

(58) Field of Classification Search
CPC ........... H02H 9/04; H02H 9/041; H02H 9/046
USPC ........................................................... 361/56
See application file for complete search history.

(56) References Cited

U.S. PATENT DOCUMENTS

| 3,919,661 | A | * | 11/1975 | Buck | H03K 17/292 |
| | | | | | 307/652 |
| 6,353,520 | B1 | * | 3/2002 | Andresen | H01L 27/0251 |
| | | | | | 361/56 |
| 6,442,008 | B1 | * | 8/2002 | Anderson | H01L 27/0259 |
| | | | | | 361/111 |
| 7,746,611 | B2 | * | 6/2010 | Hammerschmidt | H02H 9/046 |
| | | | | | 361/111 |
| 7,773,355 | B2 | * | 8/2010 | Ma | H01L 27/0255 |
| | | | | | 361/111 |
| 8,675,322 | B2 | * | 3/2014 | Wang | H02H 9/046 |
| | | | | | 361/56 |
| 2011/0096446 | A1 | | 4/2011 | Croft | |
| 2015/0070806 | A1 | * | 3/2015 | Parthasarathy | H02H 9/04 |
| | | | | | 361/57 |

FOREIGN PATENT DOCUMENTS

JP   2010-003982 A   1/2010
JP   2010-067894 A   3/2010

* cited by examiner

*Primary Examiner* — Dharti H Patel
(74) *Attorney, Agent, or Firm* — Rabin & Berdo, P.C.

(57) ABSTRACT

A semiconductor device includes: a voltage regulator generating, based on a power supply voltage, an internal power supply voltage having a voltage value lower than that of the power supply voltage and to apply the internal power supply voltage to a power supply line; an internal circuit receiving the internal power supply voltage via the power supply line and a grounding line; and a protection circuit in which first to n-th transistors of PNP type which are Darlington-connected. A collector terminal of each of the first to the n-th transistors is connected to the grounding line. An emitter terminal of the first transistor within the first to the n-th transistors is connected to the power supply line while a base terminal of the n-th transistor within the first to the n-th transistors is connected to the grounding line.

8 Claims, 3 Drawing Sheets

SEMICONDUCTOR DEVICE

BACKGROUND OF THE INVENTION

1. Field of the Invention

The present invention relates to a semiconductor device and in particular to a semiconductor device having a voltage regulator and a protection circuit formed therein.

2. Description of the Related Art

There is known a semiconductor device having an internal circuit and a voltage regulator, in which the voltage regulator generates an internal power supply voltage lower than a power supply voltage supplied via a power supply terminal and then, the internal circuit operates under the internal power supply voltage. Further, there is also known another semiconductor device having such a voltage regulator and an electrostatic discharge protection circuit (referred to as an ESD protection circuit hereinafter). The ESD protection circuit is operative so as to prevent that the internal circuit is applied with a high voltage via the power supply terminal, wherein the high voltage is caused by an electrostatic discharge (referred to as an ESD hereinafter) occurring outside of the semiconductor device (See Japanese Patent Application Kokai No. 2010-3982, for example).

The particular ESD protection circuit protects the internal circuit against the high voltage value caused by the ESD by such an arrangement that a power supply line used for the internal power supply voltage and a grounding line are forced to be connected to each other when the power supply line becomes in a state that the high voltage value is equal to or more than a predetermined voltage value in a relatively short steep rising time (protecting function).

There is however a possibility that the protecting function does not work in case that the voltage regulator operates incorrectly due to the influence of external noise and then outputs an internal power supply voltage higher than the withstanding voltage of the internal circuit. When, for example, the voltage regulator including an output transistor of P-channel MOS (metal-oxide-semiconductor) type transistor is subjected to the influence of external noise resulting in decreasing the gate voltage of the output transistor, then the internal power supply voltage increases. The increase of the internal power supply voltage due to such decrease of the gate voltage of the output transistor is gradual less than the voltage increment due to an ESD. Therefore the protecting function may not occur.

SUMMARY OF THE INVENTION

It is thus an object of the present invention to provide a semiconductor device having the internal circuit capable of being protected against a high internal power supply voltage even in case of increases of the internal power supply voltage generated by the voltage regulator.

The present invention provides a semiconductor device comprising:

a voltage regulator configured to generate, based on a power supply voltage, an internal power supply voltage having a voltage value lower than that of said power supply voltage and to apply said internal power supply voltage to a power supply line;

an internal circuit configured to receive said internal power supply voltage via said power supply line and a grounding line; and a protection circuit in which first to n-th transistors ("n" denotes an integer being 2 or more) of PNP type which are Darlington-connected with one another, wherein a collector terminal of each of said first to n-th transistors is connected to said grounding line, an emitter terminal of the first transistor within said first to n-th transistors is connected to said power supply line while a base terminal of the n-th transistor within said first to n-th transistors is connected to said grounding line.

Further, the present invention also provides another semiconductor device comprising:

a voltage regulator configured to apply an internal power supply voltage having a voltage value lower than that of a power supply voltage via a P-channel MOS type output transistor to a power supply line;

an internal circuit configured to receive said internal power supply voltage via said power supply line and a grounding line; and a protection circuit configured to restrain its increasing voltage of said power supply line in response to increase of voltage of said power supply line, said protection circuit being connected to said power supply line and said grounding line, wherein a clamp circuit configured to clamp a gate-source voltage of said output transistor to a predetermined voltage value lower than said power supply voltage wherein said source terminal of said output transistor is applied with said power supply voltage.

According to the present invention, the protection circuit described below is connected to the voltage regulator for generating the internal power supply voltage on the basis of the power supply voltage and applying the internal power supply voltage via the power supply line and the grounding line to the internal circuit. That is, the protection circuit is configured such that the collector terminal of each of the first to the n-th PNP type transistors with Darlington-connection is connected to the grounding line, and the emitter terminal of the first transistor within the first to the n-th transistors is connected to the power supply line while the base terminal of the n-th transistor within the first to the n-th transistors is connected to the grounding line.

According to such a protection circuit, even if the voltage regulator generates such a high internal power supply voltage due to the influence of external noise, it is possible to protect an internal circuit against a high internal power supply voltage generated by the voltage regulator.

In addition, the present invention is configured to have a clamp circuit provided between the gate terminal and the source terminal of the output transistor (i.e. P-channel MOS type output transistor which outputs the internal power supply voltage to the power supply line on the basis of the foregoing power supply voltage supplied to the source terminal) included in the voltage regulator wherein the clamp circuit clamps the gate-source voltage to a voltage value lower than the power supply voltage. By such a configuration, a current amount entering the power supply line is reduced in comparison with a device without the clamp circuit, when the internal power supply voltage rises. Therefore it is possible to miniaturize the size of the first transistor in which the current amount entering, so that protection circuit can be downsized.

BRIEF DESCRIPTION OF THE DRAWINGS

Some aspects and other features of the present invention are explained in the following description, taken in connection with the accompanying drawing figures wherein.

DETAILED DESCRIPTION OF THE INVENTION

Embodiments of the present invention will be described below in detail with reference to drawings appended hereto.

Figure 1:
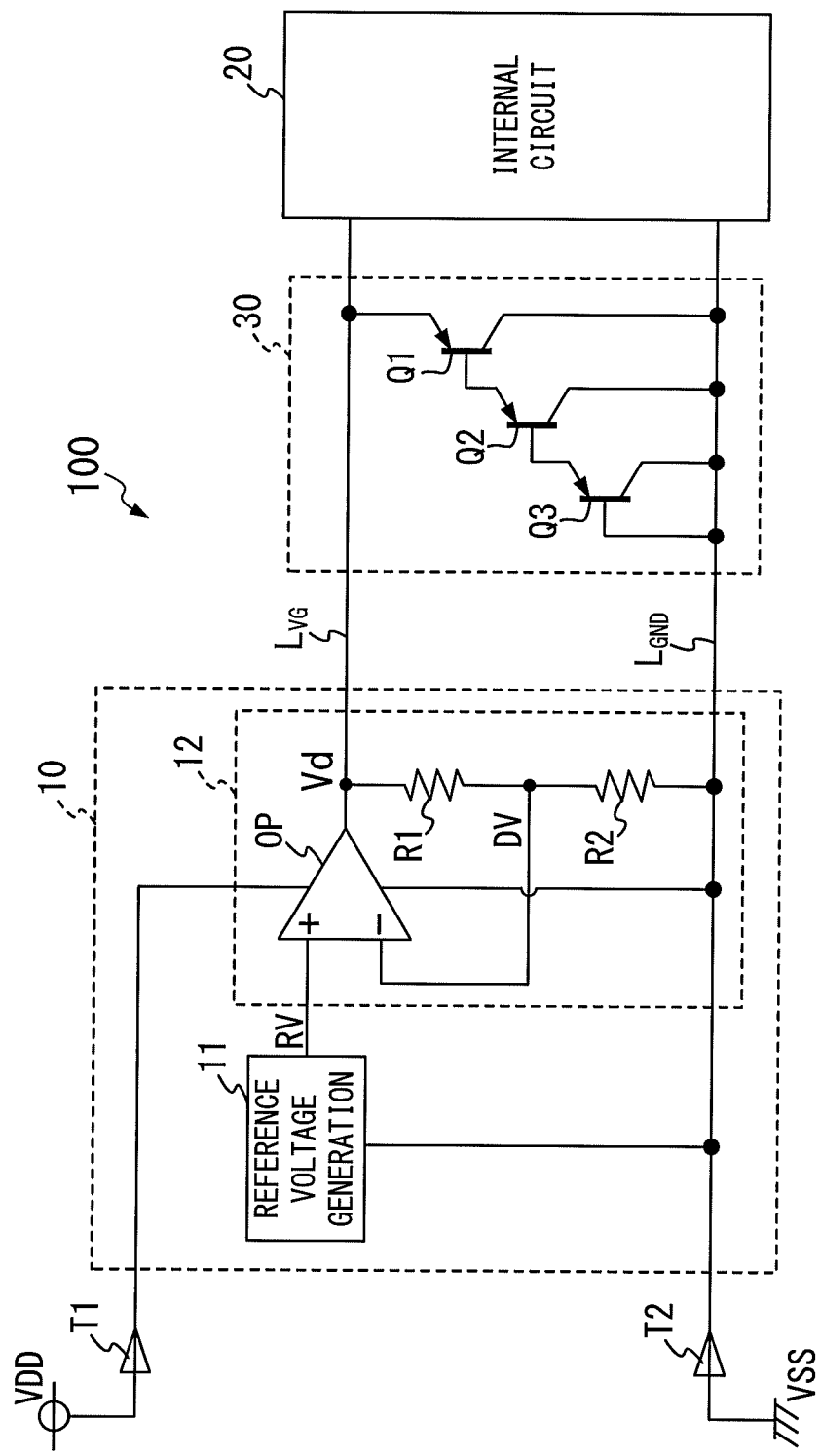
FIG. 1 is a circuit diagram illustrating a configuration of a semiconductor device 100 according to the present invention.

FIG. 1 is a circuit diagram illustrating an example of configuration of the semiconductor device 100 according to the present invention. As shown in FIG. 1, the semiconductor device 100 comprises a voltage regulator 10, an internal circuit 20 realizing a main function of a semiconductor chip per s, and a high voltage protection circuit 30. These of the voltage regulator 10, the internal circuit 20 and the high voltage protection circuit 30 are formed on the semiconductor chip.

The voltage regulator 10 generates an internal power supply voltage Vd having a constant voltage value lower than that of the power supply voltage VDD on the basis of a power supply voltage VDD supplied via a power supply terminal T1 and a ground potential VSS supplied via a grounding terminal T1, and the voltage regulator 10 applies the internal power supply voltage Vd via a power supply line $L_{VG}$ to an internal circuit 20.

As shown in FIG. 1, the voltage regulator 10 has a reference voltage generation part 11 and an amplification part 12.

The reference voltage generation part 11 generates a reference voltage RV having a predetermined voltage value on the basis of the ground potential VSS applied to a grounding line $L_{GND}$, and the reference voltage generation part 11 supplies the reference voltage to a non-inverting input terminal of an operational amplifier OP in the amplification part 12. The output terminal of the operational amplifier OP is connected to the power supply line $L_{VG}$ and one end of a resistor R1. The other end of the resistor R1 is connected to one end of a resistor R2. The other end of the resistor R2 is connected to the grounding line $L_{GND}$.

The resistors R1 and R2 constitute a voltage dividing circuit. The voltage dividing circuit supplies, to an inverting input terminal of the operational amplifier OP, a divided voltage DV divided from the internal power supply voltage Vd, i.e. a voltage supplied to the power supply line $L_{VG}$.

Figure 2:
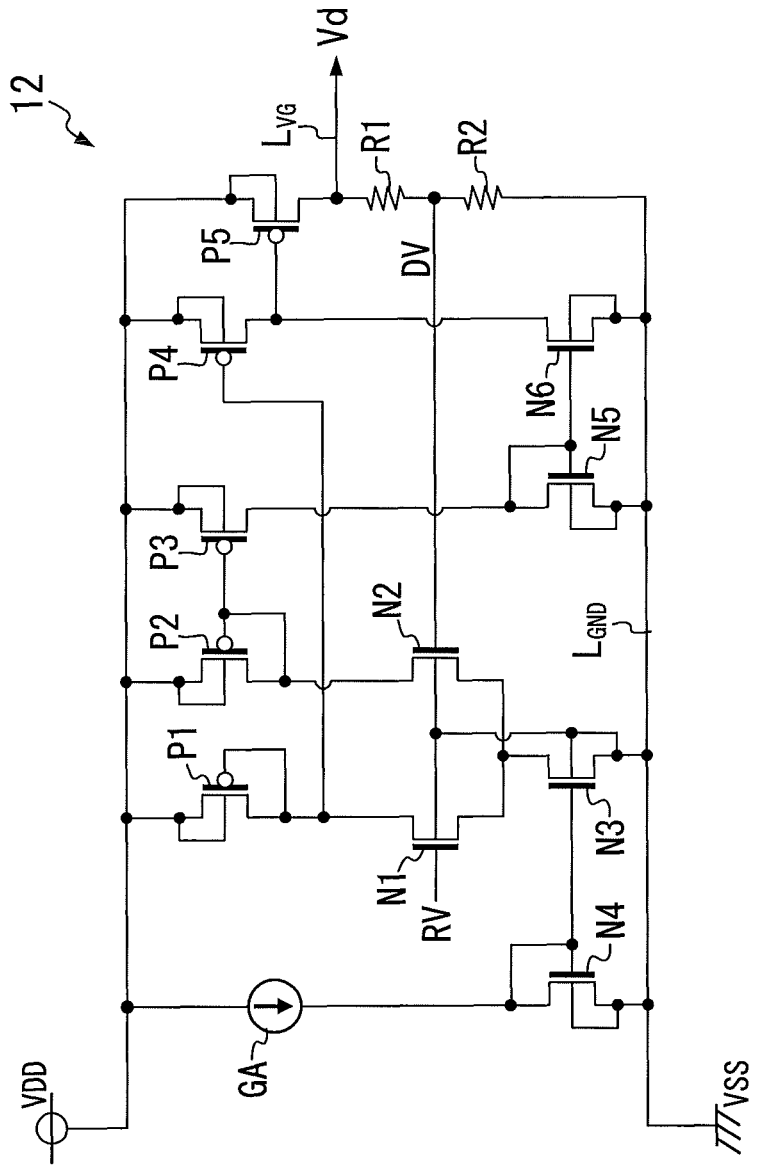
FIG. 2 is a circuit diagram illustrating an example of internal configuration of an amplification part 12.

FIG. 2 is a circuit diagram illustrating an example of internal configuration of the amplification part 12 comprising the operational amplifier OP, the resistor R1 and the resistor R2. In FIG. 2, the operational amplifier OP has a constant current source GA, N-channel MOS type transistors N1 to N6 and P-channel MOS type transistors P1 to P5.

A gate terminal of the transistor N1 is supplied with the foregoing reference voltage RV. A source terminal of the transistor N1 is connected to a source terminal of the transistor N2 and a drain terminal of the transistor N3. Further, a gate terminal of the transistor N1 corresponds to a non-inverting input terminal of the operational amplifier OP. A drain terminal of the transistor N1 is connected to a gate terminal and a drain terminal of the transistor P1. In addition, a drain terminal of the transistor N1 is connected to a gate terminal of the transistor P4.

A gate terminal of the transistor N2 is supplied with the divided voltage DV divided from the internal power supply voltage Vd by the resistor R1 and R2. Further, a gate terminal of the transistor N2 corresponds to an inverting input terminal of the operational amplifier OP. A drain terminal of the transistor N2 is connected to a gate terminal and a drain terminal of the transistor P2. In addition, a drain terminal of the transistor N2 is connected to a gate terminal of the transistor P3.

A source terminal of the transistor N3 is supplied with the ground potential VSS via the grounding line $L_{GMD}$. A gate terminal of the transistor N3 is connected to a gate terminal and a drain terminal of the transistor N4. A source terminal of the transistor N4 is supplied with ground potential VSS via the grounding line $L_{GND}$. The current source GA generates a predetermined constant current based on the supplied power supply voltage VDD and supplies the current to a drain terminal of the transistor N4.

A source terminal of each of the transistors P1 to P4 is supplied with the power supply voltage VDD. A drain terminal of the transistor P3 is connected to a drain terminal and a gate terminal of the transistor N5. A drain terminal of the transistor P3 is connected to a drain terminal and a gate terminal of the transistor N5. In addition, a drain terminal of the transistor P3 is connected to a gate terminal of the transistor N6. A drain terminal of the transistor P4 is connected to a gate terminal of the transistor P5 and a drain terminal of the transistor N6. A source terminal of each of the transistors N5 and N6 is supplied with ground potential VSS via the grounding line $L_{GND}$.

A source terminal of the transistor P5 functioning as the output transistor is applied with the power supply voltage VDD. A drain terminal of the transistor P5 is connected to the power supply line $L_{VG}$. Further, the transistor P5 is also called the output transistor hereinafter.

Further, the back-gate of each of the transistors P1 to P5 is applied with the power supply voltage VDD. The back-gate of each of the transistors N1 to N6 is applied with the ground potential VSS via the grounding line $L_{GND}$.

According to the foregoing configuration, the voltage regulator 10 generates the internal power supply voltage Vd having a voltage value corresponding to a difference value between voltage values both of the divided voltage DV and the reference voltage RV and applies via the output transistor (P5) to the power supply line $L_{VG}$. That is, the output transistor (P5) applies, to the power supply line $L_{VG}$, a voltage corresponding to the difference value between the reference voltage RV and the divided voltage DVV divided from the voltage of the power supply line $L_{VG}$, i.e. as he internal power supply voltage Vd. By this, the internal circuit 20 is supplied via the power supply line $L_{VG}$ with the internal power supply voltage Vd which is applied via the output transistor (P5) to the power supply line $L_{VG}$.

The high voltage protection circuit 30 is connected to the power supply line $L_{VG}$ and the grounding line $L_{GND}$. The high voltage protection circuit 30 restrains an increasing voltage of the power supply line $L_{VG}$ in response to an increase of voltage of said power supply line $L_{V4}$. That is, the high voltage protection circuit 30 performs a protection operation to restrain the increase of the internal power supply voltage Vd, when there is the increase of the internal power supply voltage Vd which is applied to the power supply line $L_{VG}$ by the voltage regulator 10.

As shown in FIG. 1, the high voltage protection circuit 30 includes PNP bipolar transistors Q1 to Q3 which are Darlington-connected with one another. Each collector terminal of the transistors Q1 to Q3 is connected to the grounding line $L_{GND}$. In addition, an emitter terminal of the transistor Q1 of the transistors Q1 to Q3 is connected to the power supply line $L_{VA}$. A base terminal of the transistor Q3 is connected to the grounding line $L_{GND}$.

The operation of the high voltage protection circuit 30 will now be described below, under conditions listed as follows:

A threshold voltage of a PNP transistor: 0.6 volts;

A normal power supply voltage of the internal circuit 20: 1.5 volts; and

A withstanding power supply voltage of the internal circuit 20: 4.0 volts.

As shown in FIG. 1, the Darlington-connection of the three transistors Q1 to Q3 has a total threshold voltage, i.e. (0.6 volts×3)=1.8 volts. Therefore, when the voltage regulator 10 maintains the generated internal power supply voltage Vd at a power supply voltage (1.5 volts) lower than the threshold voltage (1.8 volts), the transistors Q1 to Q3 become in an OFF state. Therefore, the internal circuit 20 is usually supplied with the internal power supply voltage Vd having the power supply voltage (1.5 volts), as it is, for such duration via the power supply line $L_{VG}$.

Here, in case that the influence of external noise occurs in the voltage regulator 10, a voltage value of the internal power supply voltage Vd output from the output transistor (P5) increases inversely proportional to reduction of the gate voltage of the output transistor (P5). On this occasion, when a voltage value becomes higher than the total threshold voltage (1.8 volts) of the internal power supply voltage Vd generated by the voltage regulator 10, each of the transistors Q1 to Q3 is in an ON state (protection operation). By this, current flows via an emitter terminal and a collector terminal of the transistor between the power supply line $L_{VG}$ and the grounding line $L_{GND}$. Therefore, during this time period, the increase of the internal power supply voltage Vd is stopped at a time point that an ON-resistance of the output transistor and an ON-resistance of the transistor Q1 of the high voltage protection circuit 30 match with each other.

According to the foregoing protection operation, even if an external noise influences to make the voltage regulator 10 generate an increased internal power supply voltage Vd, the high voltage protection circuit 30 stops the increase of the internal power supply voltage Vd and clamps the voltage Vd before the voltage Vd reaches a withstanding power supply voltage (4.0 volts) of the internal circuit 20.

Further, although the high voltage protection circuit 30 shown in FIG. 1 has the PNP transistors (Q1 to Q3) of bipolar type with a three stage Darlington-connected configuration, but the number of stages of transistors is not limited by the three stages. Namely the high voltage protection circuit 30 may have a Darlington-connected configuration with the number of stages of transistors so that the total threshold voltage of the PNP transistors is higher than a normal power supply voltage for operating the internal circuit 20 and lower than the withstanding power supply voltage of the internal circuit 20.

Figure 3:
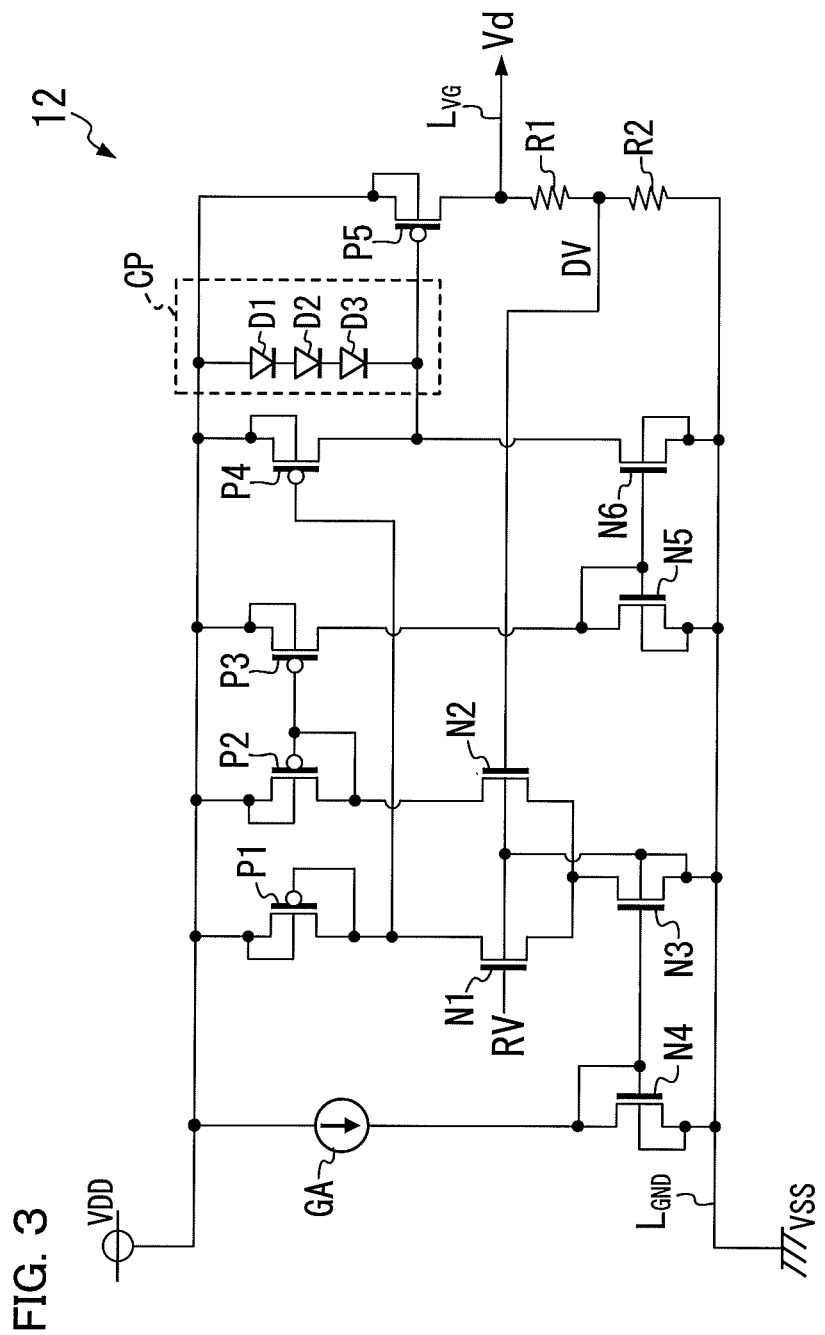
FIG. 3 is a circuit diagram illustrating another example of internal configuration of the amplification part 12.

FIG. 3 is a circuit diagram illustrating another example of internal configuration of the amplification part 12 included in the voltage regulator 10. Further, a configuration shown in FIG. 3 is the same as the configuration shown in FIG. 2 except that a clamp circuit CP is provided between the gate and source terminals of the output transistor (P5).

As shown in FIG. 3, the clamp circuit CP comprises diodes D1 to D3 of PN junction type which are connected in series one after another. On this occasion, an anode terminal of the diode D1 is connected to a source terminal of the output transistor (P5). A cathode terminal of the diode D3 is connected to a gate terminal of the transistor P5. The clamp circuit CP having such a configuration can clamp a gate-source voltage of the output transistor (P5) so as to be a voltage value lower than the power supply voltage VDD and higher than the threshold voltage of the output transistor (P5).

The operation of the high voltage protection circuit 30 comprising the voltage regulator 10 including the amplification part 12 having the configuration shown in FIG. 3 will now be described below, under conditions listed as follows:

A threshold voltage of a PNP transistor: 0.6 volts;

A normal power supply voltage of the internal circuit 20: 1.5 volts; and

A withstanding power supply voltage of the internal circuit 20: 4.0 volts.

As shown in FIG. 1, the Darlington-connection of the three transistors Q1 to Q3 has a total threshold voltage, i.e. (0.6 volts×3)=1.8 volts. Therefore, when the voltage regulator 10 maintains the generated internal power supply voltage Vd at a power supply voltage (1.5 volts) lower than the threshold voltage (1.8 volts), the transistors Q1 to Q3 become in an OFF state. Therefore, the internal circuit 20 is usually supplied with the internal power supply voltage Vd having the power supply voltage (1.5 volts), as it is, for such duration via the power supply line $L_{VG}$.

Here, in case that the influence of external noise occurs in the voltage regulator 10, a voltage value of the internal power supply voltage Vd output from the output transistor (P5) increases inversely proportional to reduction of the gate voltage of the output transistor (P5). On this occasion, when a voltage value becomes higher than the total threshold voltage (1.8 volts) of the internal power supply voltage Vd generated by the voltage regulator 10, each of the transistors Q1 to Q3 is in an ON state (protection operation). By this, current flows via an emitter terminal and a collector terminal of the transistor between the power supply line $L_{VG}$ and the grounding line $L_{GND}$. Therefore, during this time period, the increase of the internal power supply voltage Vd is stopped at a time point that an ON-resistance of the output transistor and an ON-resistance of the transistor Q1 of the high voltage protection circuit 30 match with each other.

According to the foregoing protection operation, even if an external noise influences to make the voltage regulator 10 generate an increased internal power supply voltage Vd, the high voltage protection circuit 30 stops the increase of the internal power supply voltage Vd and clamps the voltage Vd before the voltage Vd reaches a withstanding power supply voltage (4.0 volts) of the internal circuit 20.

Further, the time point that the ON-resistance of the output transistor and the ON-resistance of the transistor Q1 of the high voltage protection circuit 30 match with each other is determined by a size ratio of a size of the transistor Q1 to a size of the output transistor.

On this occasion, the size of the output transistor is determined by both a minimum voltage related to the power supply voltage VDD stipulated in the specification of the power supply and an allowable current amount to flow through the internal circuit 20 at the time that the particular minimum voltage is applied to the internal circuit 20 for the operation thereof. In case that, for example, a minimum voltage of the power supply voltage VDD of the amplification part 12 is 1.8 volts and a specification related to the voltage regulator 10 stipulates an internal power supply voltage Vd of 1.5 volts at 10 mA as a request of operation performance, it is necessary to employ an output transistor having a size sufficient to operate under a drain-source voltage of 0.3 volts at 10 mA.

Thus, the size of the output transistor (P5) is determined on the basis of the following formula of current:

$$I=(1/2)\cdot\mu\cdot C_{ox}\cdot(W/L)\cdot(V_{gs}-Vt)^2$$

I: a driving current;
μ: a carrier mobility;
$C_{ox}$: a gate capacitance of the output transistor (P5);
W: a gate width of the output transistor (P5);
L: a gate length of the output transistor (P5);
$V_{gs}$: a gate-source voltage of the output transistor (P5); and
Vt: a threshold voltage of the output transistor (P5).

By the way, the specification of the power supply stipulates the voltage range which can be taken as the supplied power supply voltage VDD via the power supply terminal T1. It is thus presumed that a power supply voltage VDD having a maximum voltage value within the voltage range based on the specification of the power supply is supplied via the power supply terminal T1. When, for example, the maximum voltage value stipulated in the particular specification of the power supply is 5 volts and external noise influences the output transistor (P5) so that the gate voltage thereof declines to 0 volts, then the output transistor (P5) generates an internal power supply voltage Vd having 5 volts. On this occasion, in the configuration shown in FIG. 2, the 5 volts of voltage value is equal to the gate-source voltage $V_{gs}$ of the output transistor (P5) just as it is.

In view of the foregoing formula of current, the output transistor (P5) supplies, to the power supply line $L_{VA}$, the driving current having a current amount corresponding to the maximum voltage value (i.e. $V_{gs}$) which is stipulated by the specification of the power supply voltage VDD. Then the high voltage protection circuit 30 causes the supplied driving current of the power supply line $L_{VG}$ to flow via the transistor Q1 from the power supply line $L_{VG}$ into the grounding line $L_{GND}$ so as to reduce a voltage value (5 volts) of the internal power supply voltage Vd lower than a withstanding power supply voltage (4 volts) of the internal circuit 20.

Therefore, in case that the configuration shown in FIG. 2 is employed as the voltage regulator 10, it is necessary to set the transistor Q1 of the high voltage protection circuit 30 having a size sufficient to enable to flow current corresponding to the maximum voltage value regulated by the specification of the high voltage protection circuit 30.

Whereas, in case that the configuration shown in FIG. 3 is employed as the voltage regulator 10, the clamp circuit CP clamps a gate-source voltage $V_{gs}$ of the output transistor (P5) to a triple voltage value of the threshold voltage Vf of each of the diodes D1 to D3, i.e. a voltage lower than the power supply voltage VDD (5 volts).

When, for example, the threshold voltage Vf is 0.8 volts, a gate-source voltage $V_{gs}$ of the output transistor (P5) becomes 2.4 volts even if a voltage value of the power supply voltage VDD is 5 volts.

Namely, the clamp circuit CP causes a gate-source voltage $V_{gs}$ of the output transistor (P5) to be lower than a voltage value of the power supply voltage VDD.

Thus, as seen from the foregoing formula of current, the driving current supplied to the power supply line $L_{VG}$ is reduced in comparison with that a gate-source voltage $V_{gs}$ of the output transistor (P5) is apt to be equal to a voltage value of the power supply voltage VDD in the configuration shown in FIG. 2.

Therefore, the configuration shown in FIG. 3 employing the voltage regulator 10 enables to miniaturize the size of the transistor Q1 of the high voltage protection circuit 30 in comparison with the configuration shown in FIG. 2 and obtain reduction of the size of the high voltage protection circuit 30.

Further, although the foregoing embodiment employs the high voltage protection circuit 30 comprising the transistors Q1 to Q3 of bipolar type which are Darlington-connected in the three stages as shown in FIG. 1, but the number of stages of transistors is not limited by the three stages. Namely the high voltage protection circuit 30 may have a two stage Darlington-connected configuration in which Q2 is omitted from the transistors Q1 to Q3 shown in FIG. 1 and a base terminal of Q1 is connected to an emitter terminal of Q3. Alternatively the high voltage protection circuit 30 may have a multi stage Darlington-connected configuration in which two or more PNP transistors are Darlington-connected to and between the transistors Q1 and Q3 shown in FIG. 1. That is, in the high voltage protection circuit 30, the number of stages of PNP transistors of Darlington-connected configuration is so set preferably that the total threshold voltage of the transistors is higher than a normal power supply voltage of the internal circuit 20 and lower than the withstanding power supply voltage of the internal circuit 20.

Further, although the clamp circuit CP shown in FIG. 3 employs the diodes D1 to D3 with three stages are connected to one another in series, but the number of stages of diodes is not limited by the three stages.

In conclusion, the clamp circuit CP may have an in-series diode group comprising the first diode (D1) whose anode terminal is connected to the source terminal of the output transistor (P5); and a second diode (D3) whose cathode terminal is connected to the gate terminal of the output transistor, among plural diodes connected in series.

Further, the clamp circuit CP shown in FIG. 3 may employ diode-connected MOS transistors in each of which the own gate terminal is connected to the own drain terminal (or to the own source terminal) instead of the diode D1 to D3.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims.

This application is based upon and claims the benefit of priority from the prior Japanese Patent Application No. 2015-063718 filed on Mar. 26, 2015, the entire contents of which are incorporated herein by reference.

What is claimed is:

1. A semiconductor device comprising:
    an internal circuit;
    a power supply line;
    a grounding line;
    a voltage regulator configured to generate, based on a power supply voltage, an internal power supply voltage for operating said internal circuit to apply said internal power supply voltage to said internal circuit via said power supply line and said grounding line, said internal power supply voltage having a voltage value lower than a voltage value of said power supply voltage; and
    a protection circuit having first to n-th transistors ("n" denotes an integer being 2 or more) of PNP type which are Darlington-connected with one another, wherein
a collector terminal of each of said first to n-th transistors is connected to said grounding line, and
an emitter terminal of the first transistor within said first to n-th transistors is connected to said power supply line while a base terminal of the n-th transistor within said first to n-th transistors is connected to said grounding line.

2. The semiconductor device according to claim 1, wherein
said voltage regulator includes a P-channel MOS type output transistor which supplies, to said power supply line, a voltage corresponding to a difference value between voltage values of a reference voltage and a divided voltage divided from a voltage of said power supply line, as said internal power supply voltage, and wherein
said power supply voltage is applied to a source terminal of said output transistor,
said semiconductor device further comprising a clamp circuit which is provided between a gate terminal and said source terminal of said output transistor and clamps a gate-source voltage of said output transistor to a predetermined voltage value lower than said power supply voltage.

3. The semiconductor device according to claim 2, wherein
said predetermined voltage value is higher than a threshold voltage of said output transistor.

4. The semiconductor device according to claim 2, wherein
said clamp circuit has an in-series diode group comprising a first diode whose anode terminal is connected to said source terminal of said output transistor; and a second diode whose cathode terminal is connected to said gate terminal of said output transistor, among plural diodes connected in series.

5. A semiconductor device comprising:
a voltage regulator configured to apply an internal power supply voltage having a voltage value lower than a voltage value of a power supply voltage via a P-channel MOS type output transistor to a power supply line;
an internal circuit configured to receive said internal power supply voltage via said power supply line and a grounding line; and
a protection circuit configured to restrain its increasing voltage of said power supply line in response to increase of voltage of said power supply line, said protection circuit being connected to said power supply line and said grounding line, wherein
a clamp circuit is configured to clamp a gate-source voltage of said output transistor to a predetermined voltage value lower than said power supply voltage, said power supply voltage being applied to a source terminal of said output transistor.

6. The semiconductor device according to claim 5, wherein
said protection circuit is configured such that a collector terminal of each of first to said n-th transistors ("n" denotes an integer being 2 or more) of PNP type and being Darlington-connected is connected to said grounding line, and an emitter terminal of said first transistor within said first to said n-th transistors is connected to said power supply line while a base terminal of said n-th transistor within said first to said n-th transistors is connected to said grounding line.

7. The semiconductor device according to claim 5, wherein
said predetermined voltage value is higher than a threshold voltage of said output transistor.

8. The semiconductor device according to claim 5, wherein
said clamp circuit has an in-series diode group comprising a first diode whose anode terminal is connected to said source terminal of said output transistor; and a second diode whose cathode terminal is connected to a gate terminal of said output transistor, among plural diodes connected in series.

* * * * *